United States Patent [19]

Kaneko et al.

[11] 4,454,057
[45] Jun. 12, 1984

[54] LIQUID CRYSTAL COMPOSITION

[75] Inventors: Masaharu Kaneko, Kanagawa; Tetsuo Ozawa; Tomio Yoneyama, both of Tokyo; Shuji Imazeki, Ibaraki; Akio Mukoh, Ibaraki; Mikio Sato, Ibaraki, all of Japan

[73] Assignees: Hitachi Ltd.; Mitsubishi Chemical Industries Limited, both of Tokyo, Japan

[21] Appl. No.: 392,909

[22] Filed: Jun. 28, 1982

[30] Foreign Application Priority Data

Jun. 26, 1981 [JP] Japan ............................ 56-99521

[51] Int. Cl.³ ........................... C09K 3/34; G02F 1/13
[52] U.S. Cl. ................................. 252/299.1; 252/299.5; 350/345; 350/349
[58] Field of Search .................. 252/299.1, 299.5; 350/349, 345

[56] References Cited

U.S. PATENT DOCUMENTS

| | | | |
|---|---|---|---|
| 4,211,473 | 7/1980 | Shanks | 350/349 |
| 4,378,302 | 3/1983 | Aftergut et al. | 252/299.1 |

FOREIGN PATENT DOCUMENTS

| | | | |
|---|---|---|---|
| 26004 | 4/1981 | European Pat. Off. | 252/299.1 |
| 47027 | 3/1982 | European Pat. Off. | 252/299.1 |
| 2851513 | 6/1980 | Fed. Rep. of Germany | 252/299.1 |
| 3038372 | 5/1981 | Fed. Rep. of Germany | 252/299.1 |
| 54-48572 | 4/1979 | Japan | 252/299.1 |
| 54-48571 | 4/1979 | Japan | 252/299.1 |
| WO82/01191 | 4/1982 | PCT Int'l Appl. | 252/299.1 |

*Primary Examiner*—Teddy S. Gron
*Attorney, Agent, or Firm*—Sughrue, Mion, Zinn, Macpeak & Seas

[57] ABSTRACT

A liquid crystal composition comprising a host liquid crystal and at least one perylene dye dissolved therein represented by the formula:

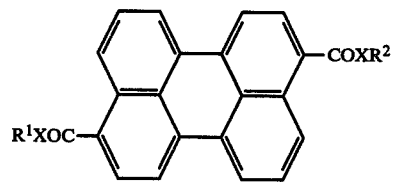

wherein X represents an oxygen atom or a sulfur atom, $R^1$ and $R^2$ each represents an aryl group when X represents an oxygen atom; or an aryl group or an alkyl group containing 1 to 18 carbon atoms when X represents a sulfur atom.

5 Claims, 7 Drawing Figures

LIQUID CRYSTAL COMPOSITION

FIELD OF THE INVENTION

The present invention relates to a guest-host type liquid crystal composition containing a perylene series pleochroic dye.

BACKGROUND OF THE INVENTION

Pleochroic dyes are roughly classified into two groups. One group dyes are those in which the direction of transition moment of visible light absorption is almost in parallel with the direction of the longer axis of the molecule and which, when dissolved as a guest molecule in a host liquid crystal, are aligned so that the direction of the longer axis of the dye molecule becomes the same as that of the axis of oriented liquid crystal molecule. Such dyes are called pleochroic dyes having parallel dichroism (or P-type dyes). The other group dyes are those in which the direction of transition moment of visible light absorption is almost perpendicular to the direction of the longer axis of molecule and which, when dissolved as a guest molecule in a liquid crystal, are aligned so that the direction of the longer axis of the dye molecule becomes the same as that of the axis of oriented liquid crystal molecule. Such dyes are called pleochroic dyes having perpendicular dichroism (or N-type dyes). The present invention relates to a liquid crystal composition containing a dye belonging to the first group, i.e., pleochroic dye having parallel dichroism.

Pleochroic dyes are characterized in that the degree of light absorption depends upon the relative relation between the direction of absorption transition moment of dye molecule and that of electric vector of light. That is, the absorption becomes maximum when the direction of absorption transition moment is in parallel with the electric vector of light, and becomes minimum when the direction of absorption transition moment is perpendicular to the electric vector of light.

When a nematic, cholesteric or smectic liquid crystal containing such pleochroic dye is sandwiched between facing two electrodes and a voltage is applied to it across the electrodes, the liquid crystal molecules exhibit turbulent motion or are uniformly aligned along the direction of electric field depending upon the dielectric characteristics or fluid characteristics of the liquid crystal. In this occasion, the pleochroic dye molecules also move together with the liquid crystal molecules, and hence relative relation between the direction of absorption transition moment of the pleochroic dye molecule and the electric vector of incident light is changed, and consequently, the light absorption characteristics of a liquid crystal display devices are changed.

Such a phenomenon is widely known as "guest-host effect" and a color display device using electric control can be constituted by utilizing this effect (see "Guest-Host Interaction in Nematic Liquid Crystals: A New Electro-Optic Effects" reported by G. H. Heilmeier and L. A. Zanoni in Applied Physics Letters, Vol. 13, p. 91 (1968)).

The pleochroic dyes to be used as a guest in a liquid crystal display utilizing the above-described guest-host effect are required to possess: (1) a high "order parameter" in a host liquid crystal; (2) a hue according to the end-use; (3) a sufficient solubility in a host liquid crystal; and (4) a high stability (light stability, heat stability, and electric stability).

Of the above-described requirements, order parameter (1) (usually presented as S) means the degree of alignment of absorption axis of dye molecule with respect to orientation direction of host liquid crystal molecules, and is defined by the following equation:

$$S = \tfrac{1}{2}(3\overline{\cos^2 \theta} - 1)$$

wherein the term of $\cos^2 \theta$ is timewise averaged, and $\theta$ represents an angle which the absorption axis of the dye molecule makes with the orientation direction of host liquid crystal molecules. The order parameter S of pleochroic dye molecule is experimentally determined by the following equation:

$$S = \frac{A_\parallel - A_\perp}{2A_\perp + A_\parallel}$$

wherein $A_\parallel$ and $A_\perp$ represent the absorbances of the dye molecules for the light polarized parallel to and perpendicular to the orientation direction of the host guest crystal, respectively.

Specifically, the order parameter S is a value which governs the contrast of a guest-host type liquid crystal display device. With pleochroic dyes having parallel dichroism, the nearer the value to 1 which is the theoretical maximum, the less the degree of residual color in white background parts, which serves to realize bright and highly contrasty display.

Additionally, the ratio of $A_\parallel$ to $A_\perp$, $A_\parallel/A_\perp$, is called dichroism ratio (usually presented as R), and represents the degree of parallelism of the absorption axis of dye molecule with respect to the direction to which host liquid crystal molecules are oriented, similarly with the order parameter. With pleochroic dyes having parallel dichroism, the dichroism ratio R takes a value of 1 or more and, the more the value, the brighter and more contrasty becomes the display.

The value of order parameter S required for a pleochroic dye is difficultly specified, because it depends upon the end-use and the conditions of use of the dye-containing guest-host type element but, usually, it is said to be desirably at least 0.5, preferably 0.7 or more, at about room temperature.

As to the hue (2) referred to hereinbefore, the dyes must satisfy requirements for a wide variety of hues, taking into consideration the purposes of coloration such as to increase displayed information, increase degree of freedom of design, and improve fashionability. Basically, if three primary colors of yellow, magenta, and cyan blue are obtained, all hues can be obtained by subtractive mixture of them. Therefore, with respect to the problem of hue, it is of importance to obtain a pleochroic dye showing one of the three primary colors.

As to the solubility (3), fundamentally the higher, the better. It is needless to say that minimum solubility required varies depending upon the end-use and the condition of use of a guest-host element containing the pleochroic dye.

An object of the present invention is to provide a liquid crystal composition containing a pleochroic dye which satisfies the fundamental requirements (1), (2) and (4) described hereinbefore, which shows a yellow color, one of the primary colors, and which gives a strong fluorescence.

It is well known that a yellow color is important not only as one of the primary colors but as an ingredient for preparing a practically useful black or green color.

In addition, in a guest-host type liquid crystal display, the use of a pleochroic dye having strong fluorescent properties as a guest provides the possibility of improving visibility and design properties of the liquid crystal element, which serves to expand the application of the element.

Further, the use of a pleochroic dye having strong fluorescent properties is advantageous in that it enables to constitute a special structure guest-host type display utilizing the strong fluorescence as well as an ordinary guest-host type display. (Examples of such guest-host type liquid crystal display utilizing fluorescence are found in A. Hochbaum, L. J. Yu and M. M. Labes, Journal of Applied Physics, Vol. 51, p. 867 (titled as "Fluorescence of guest molecules in a scattering state of a liquid crystal" (1980), Japanese Patent Laid-Open No. 48571/79, etc.)

Relationship between the molecular structure of pleochroic dye and the various properties has not fully been clarified yet, and hence it is quite difficult to select a pleochroic dye which has a desired hue and satisfies all requirements described hereinbefore based on knowledges about known dyes.

As yellow pleochroic dyes, there have heretofore been known, for example, azo or azomethine type dyes as follows:

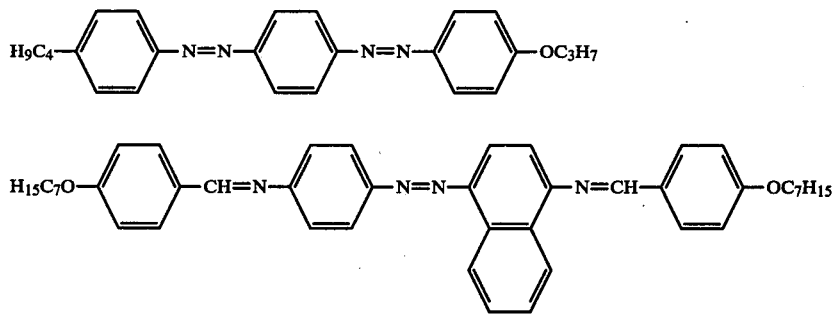

(See H. Seki et al., Preliminary Drafts for the 27th Applied Physics Combined Lecture Meeting, 114 (1980), titled "Guest-Host Effect of Liquid Crystals".)

However, fluorescence of these pleochroic dyes is too weak to be clearly recognized visually. With azomethine dyes, the bond of —N=CH— in the molecule is known to react with water to cause hydrolysis reaction as follows:

As the sealing material for at present practically used liquid crystal display elements, organic sealing materials are primarily used. In general, such organic sealing materials are so water-permeable that it is quite possible that water having permeated into the liquid crystal reacts with the azomethine dye as illustrated above to adversely affect various properties of the element.

With the above-described prior art in mind, the inventors have made intensive investigations and, as a result, the inventors have found the structure of perylene dyes which show a yellow color, which have strongly fluorescent properties, and which possess excellent order parameter, excellent solubility, and excellent stability, thus having achieved the present invention based on the findings.

As the examples of using perylene dyes in liquid crystal display prior to the present invention, the following dye is seen in Japanese Patent Laid-Open No. 48571/79, etc.:

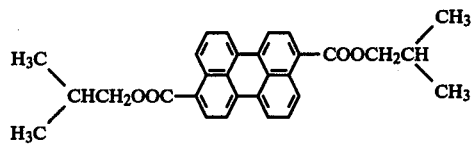

When this dye was actually synthesized and dissolved in a phenylcyclohexane type mixed liquid crystal of ZLI-1132 to be described hereinafter to measure the order parameter according to the method to be described hereinafter, the order parameter of the dye was found to be only 0.46, which is less than the usually desired level.

Thus, the inventors have examined the kind, number, and position of substituents to be introduced to the perylene skeleton with many compounds. The perylene skeleton is numbered as follows, and selection of kind, number, and position of substituents on the perylene skeleton exerts great influences on the characteristics of final pleochroic dyes.

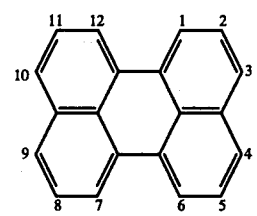

That is, it is no exaggeration to say that development of a pleochroic dye necessary for realizing a guest-host type liquid crystal display having excellent characteristics depends upon selection of the kind, number and position of substituents on the fundamental perylene skeleton as well as selection of the fundamental skeleton.

In other words, mere selection of a fundamental skeleton of dye such as anthraquinone or perylene is usually insufficient, and a desired pleochroic dye can be obtained only by strictly specifying the kind, number, and position of substituents on the fundamental skeleton. The scope of such selection is not necessarily wide for a particular purpose.

The inventors have made investigations based on the above-mentioned situation and, as a result, the inventors have found that dyes with desired properties can be obtained by introducing specific substituents to specific positions of the perylene skeleton, thus having completed the present invention.

SUMMARY OF THE INVENTION

The object of the present invention is to provide a liquid crystal composition comprising a host liquid crystal and at least one perylene dye dissolved therein represented by the formula (I):

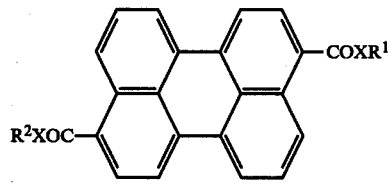

(I)

wherein X represents an oxygen atom or a sulfur atom, $R^1$ and $R^2$ each represents an aryl group when X represents an oxygen atom; or an aryl group or an alkyl group containing 1 to 18 carbon atoms when X represents a sulfur atom.

DETAILED DESCRIPTION OF THE INVENTION

Figure 1:
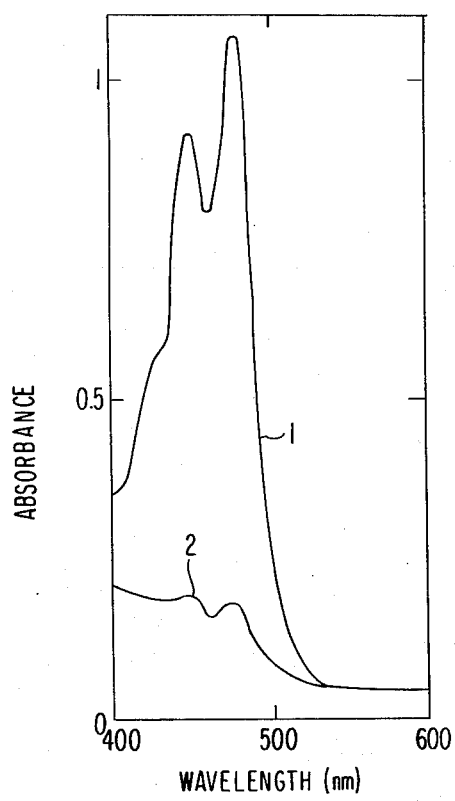
FIGS. 1 to 6 show spectral characteristics of the dyes of the present invention obtained in Examples 2 to 7, respectively.

The kind, number, and position of the substituents on the perylene dye skeleton represented by (I) are strictly specified. That is, group —$COXR^1$ and group —$COXR^2$ must be in 3- and 9-positions of the perylene skeleton, respectively. Any change in the kind, number, and position of these substituents would cause serious change in the characteristics of hue, order parameter, solubility, etc., to spoil the effects of the present invention. It has not been reported to use perylene dyes of the structure represented by the formula (I) in a guest-host type liquid crystal display.

Specific examples of $R^1$ and $R^2$ in the perylene dyes represented by the formula (I) include unsubstituted aryl groups such as a phenyl group, an α-naphthyl group, a β-naphthyl group, etc.; aryl groups substituted by an alkyl group or groups (e.g., a methyl group, an ethyl group, a straight- or branched-chain propyl, butyl, pentyl, hexyl, heptyl, octyl, nonyl, decyl, dodecyl or octadecyl group, etc.); aryl groups substituted by an alkoxyalkyl group or groups (e.g., a propoxymethyl group, a butoxymethyl group, an octyloxymethyl group, a butoxymethyl group, etc.); aryl groups substituted by a cycloalkyl group or groups (e.g., a cyclohexyl group, a 4-propylcyclohexyl group, a 4-butylcyclohexyl group, a 4-heptylcyclohexyl group, etc.); aryl groups substituted by an alkoxy group or groups (e.g., a methoxy group, a propoxy group, a butoxy group, a hexyloxy group, an octyloxy group, etc.); aryl groups substituted by an aryl group or groups (e.g., a phenyl group, a 4-propylphenyl group, a 4-butylphenyl group, a 4-octylphenyl group, etc.); aryl groups substituted by an aralkyloxy group or groups (e.g., a benzyloxy group); aryl groups substituted by an ester group or groups (e.g., a methoxycarbonyl group, a butoxycarbonyl group, a cycloalkoxycarbonyl group, an aryloxycarbonyl group, etc.); aryl groups substituted by an acyloxy group or groups (e.g., an acetoxy group, an octanoyloxy group, a cycloalkylcarbonyloxy group, an arylcarbonyloxy group, etc.); and aryl groups substituted by a halogen atom or atoms (e.g., a fluorine atom, a chlorine atom, a bromine atom, etc.), and specific examples of alkyl group containing 1 to 18 carbon atoms include a methyl group, an ethyl group, a straight- or branched-chain propyl, butyl, pentyl, hexyl, octyl, decyl, dodecyl or octadecyl group, etc.

The perylene dyes represented by the formula (I) can be synthesized, for example, by reacting a perylene compound represented by the formula (II):

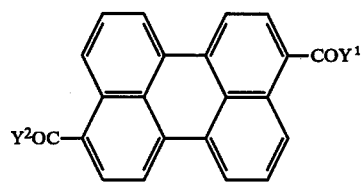

(II)

wherein $Y^1$ and $Y^2$ each represents a halogen atom such as a chlorine atom or a bromine atom, or group $XR^1$ (wherein X and $R^1$ are the same as defined above with respect to the formula (I)), with at least one of $Y^1$ and $Y^2$ being a halogen atom, with either or both of a compound represented by the formula (III) and a compound represented by the formula (IV):

$R^1XH$ (III)

$R^2XH$ (IV)

wherein X, $R^1$ and $R^2$ are the same as defined in the formula (I).

The perylene dye is dissolved in the host liquid crystal in an amount to the extent that the fluorescence of the dye can be recognized visually.

Namatic liquid crystals to be used in the present invention can be selected from a considerably wide range of liquid crystals as long as they show a nematic state in an operating temperature range. Such nematic liquid crystals can take a cholesteric state when an optically active substance to be described hereinafter is added thereto. Examples of nematic liquid crystals include the substances given in Table 1 and derivatives thereof.

TABLE 1

| No. | Type | Example |
|---|---|---|
| 1 | Cyclohexylcyclohexane type |  |

TABLE 1-continued

| No. | Type | Example |
|---|---|---|
| 2 | Phenylcyclohexane type | R'—[H]—[phenyl]—X |
| 3 | Biphenyl type | R'—[phenyl]—[phenyl]—X |
| 4 | Terphenyl type | R'—[phenyl]—[phenyl]—[phenyl]—X |
| 5 | Cyclohexyl cyclohexanoate type | R'—[H]—COO—[H]—X |
| 6 | Phenyl cyclohexylcarboxylate type | R'—[H]—COO—[phenyl]—X |
| 7 | Ester type | R'—[phenyl]—COO—[phenyl]—X |
| 8 | Diester type | R'—[phenyl]—COO—[phenyl]—COO—[phenyl]—X<br>X—[phenyl]—COO—[phenyl]—COO—[phenyl]—R' |
| 9 | Cyclohexylbiphenyl type | R'—[H]—[phenyl]—[phenyl]—X |
| 10 | Biphenyl cyclohexylcarboxylate type | R'—[H]—COO—[phenyl]—[phenyl]—X |
| 11 | Biphenyl ester type | R'—[phenyl]—[phenyl]—COO—[phenyl]—X<br>X—[phenyl]—[phenyl]—COO—[phenyl]—R' |
| 12 | Thioester type | R'—[phenyl]—COS—[phenyl]—X |

TABLE 1-continued

| No. | Type | Example |
|---|---|---|
| 13 | Schiff type | 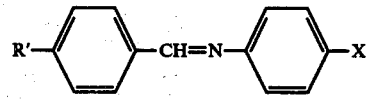 |
| 14 | Pyrimidine type | 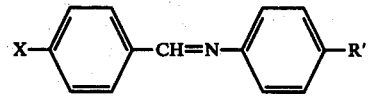 |
| 15 | Dioxane type | 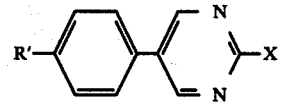 |
| 16 | Cyclohexylmethyl ether type | 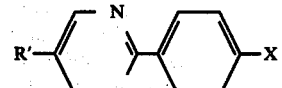 |
| 17 | Cinnamonitrile type | 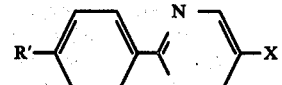 |

In the above formulae, $R^1$ represents an alkyl group or an alkoxy group, and X represents a nitro group, a cyano group or a halogen atom.

Liquid crystals given in Table 1 all show a positive dielectric anisotropy. Known ester type, azoxy type, azo type, Schiff type, pyrimidine type, diester type or biphenyl ester type liquid crystals showing a negative dielectric anisotropy can also be used by mixing with a liquid crystal showing a positive dielectric anisotropy so that the resulting mixed liquid crystal shows in the whole a positive dielectric anisotropy. Further, liquid crystals showing a negative dielectric anisotropy can be used as such by employing a proper element device constitution and a proper driving method.

As the host liquid crystal substance to be used in the present invention, any of the liquid crystal compounds shown in Table 1 and the mixtures thereof may be used. A liquid crystal substance sold by Merck & Co. under the trade name of ZLI 1132 which is a mixture of the following four liquid crystal compounds:

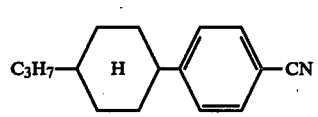 38.4% by weight

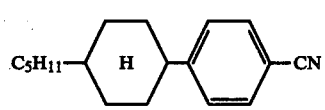 34.2% by weight

-continued

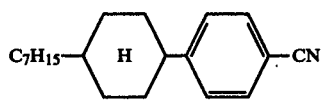
18.1% by weight

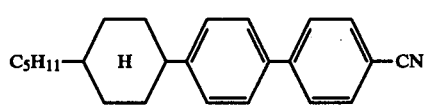
9.3% by weight and a liquid crystal substance sold by British Drug House Co. under the trade name of E-7 which is a mixture of the following four liquid crystal compounds:

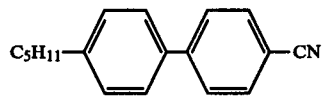
51% by weight

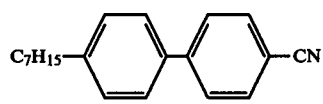
25% by weight

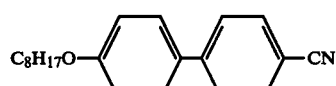
16% by weight

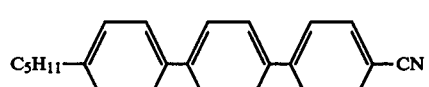
8% by weight have been found to be particularly useful in the present invention.

As the optically active substance to be used in the present invention, there are illustrated chiral nematic compounds such as those prepared by introducing an optically active group (e.g., a 2-methylbutyl group, a 3-methylbutoxy group, a 3-methylpentyl group, a 3-methylpentoxy group, a 4-methylhexyl group, or a 4-methylhexyloxy group) to a nematic liquid crystal compound. In addition, optically active substances such as alcohol derivatives (e.g., l-menthol, d-borneol, etc.) shown in Japanese Patent Laid-Open No. 45546/76, ketone derivatives (e.g., d-camphor, 3-methylcyclohexanone, etc.), carboxylic acid derivatives (e.g., d-citronellic acid, l-camphoric acid, etc.), aldehyde derivatives (e.g., d-citronellal, etc.), alkene derivatives (e.g., d-limonene, etc.), amines, amides, nitriles, etc., can, of course, be used.

As the element device, known element devices for liquid crystal display can be used in the present invention. That is, in general, there are used those element devices which are constituted by two glass plates at least one of which is transparent, which are in parallel with each other and spaced from each other via a proper spacer, and on which a transparent plane electrode of arbitrary pattern is provided in a facing manner. The spacer decides the gap between the two glass plates. From the practical point of view, the element gap is preferably 3 to 100 μm, most preferably 5 to 50 μm.

The yellow, pleochroic perylene type dyes to be used for the display of the present invention and liquid crystal compositions containing such dyes will now be described in more detail by reference to examples.

EXAMPLE 1

Examples of the pleochroic perylene type dyes to be used in the present invention are given in Table 2 together with maximum absorption wavelength, order parameter S, and dichroism ratio R.

TABLE 2

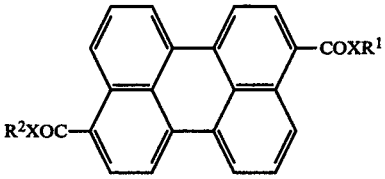

| No. | X | $R^1, R^2$ | Maximum Absorption Wavelength (nm) | Order Parameter | Dichroism Ratio |
|---|---|---|---|---|---|
| 1 | O | —⟨⟩ | 477 | 0.68 | 7.5 |
| 2 | O | —⟨⟩—CH$_3$ | 477 | 0.69 | 7.7 |
| 3 | O | —⟨⟩—C$_4$H$_9$(n) | 477 | 0.70 | 7.9 |
| 4 | O | —⟨⟩—CH(CH$_3$)$_2$ | 477 | 0.68 | 7.4 |

TABLE 2-continued

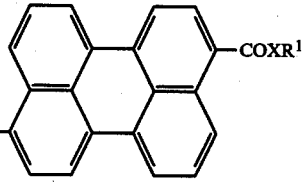

| No. | X | R¹, R² | Maximum Absorption Wavelength (nm) | Order Parameter | Dichroism Ratio |
|---|---|---|---|---|---|
| 5 | O | —⟨C₆H₄⟩—C(CH₃)₃ | 477 | 0.68 | 7.3 |
| 6 | O | —⟨C₆H₄⟩—⟨cyclohexyl-H⟩—C₃H₇(n) (cyclohexane ring: trans configuration) | 477 | 0.73 | 9.2 |
| 7 | O | —⟨C₆H₄⟩—OC₄H₉(n) | 477 | 0.73 | 9.1 |
| 8 | O | —⟨C₆H₄⟩—OC₆H₁₃(n) | 478 | 0.72 | 8.7 |
| 9 | O | —⟨C₆H₄⟩—⟨C₆H₄⟩—C₅H₁₁(n) | 478 | 0.74 | 9.6 |
| 10 | O | —⟨C₆H₄⟩—C₃H₇(n);  —⟨C₆H₄⟩—C₄H₉(n) | 478 | 0.70 | 8.1 |
| 11 | O | —⟨C₆H₄⟩—OCH₂—⟨C₆H₄⟩—OC₄H₉(n) | 478 | 0.72 | 8.7 |
| 12 | O | —⟨C₆H₄⟩—COOC₄H₉(n) | 477 | 0.72 | 8.7 |
| 13 | O | —⟨C₆H₄⟩—COO—⟨cyclohexyl-H⟩—⟨cyclohexyl-H⟩ | 477 | 0.73 | 9.2 |
| 14 | O | —⟨C₆H₄⟩—COO—⟨cyclohexyl-H⟩—C₄H₉(n) | 477 | 0.73 | 9.2 |
| 15 | O | —⟨C₆H₄⟩—COO—⟨C₆H₄⟩—C₄H₉(n) | 477 | 0.73 | 9.2 |
| 16 | O | —⟨C₆H₄⟩—OCOC₇H₁₅(n) | 477 | 0.70 | 8.1 |
| 17 | O | —⟨C₆H₄⟩—OCO—⟨cyclohexyl-H⟩—C₅H₁₁(n) | 477 | 0.72 | 8.7 |
| 18 | O | —⟨C₆H₄⟩—OCO—⟨C₆H₄⟩—OC₄H₉(n) | 477 | 0.72 | 8.7 |
| 19 | O | —⟨C₆H₄⟩—Cl | 477 | 0.69 | 7.7 |

TABLE 2-continued

[Structure: perylene-like aromatic system with COXR¹ group at top right and R²XOC- group at left]

| No. | X | R¹, R² | Maximum Absorption Wavelength (nm) | Order Parameter | Dichroism Ratio |
|---|---|---|---|---|---|
| 20 | S | —C₈H₁₇(n) | 475 | 0.61 | 5.7 |
| 21 | S | —⟨phenyl⟩—C₄H₉(n) | 480 | 0.73 | 9.0 |
| 22 | S | —⟨phenyl⟩—CH(CH₃)₂ | 480 | 0.71 | 8.3 |
| 23 | S | —⟨phenyl⟩—⟨cyclohexyl-H⟩—C₄H₉(n) (cyclohexane ring: trans configuration) | 480 | 0.74 | 9.7 |
| 24 | S | —⟨phenyl⟩—OC₄H₉(n) | 480 | 0.74 | 9.6 |
| 25 | S | —⟨phenyl⟩—⟨phenyl⟩—C₅H₁₁(n) | 480 | 0.75 | 10.2 |
| 26 | S | —⟨phenyl⟩—C₃H₇(n)  —⟨phenyl⟩—C₄H₉(n) | 480 | 0.73 | 9.2 |

The characteristic properties of each dye shown in Table 2 were determined as follows. That is, one of the dyes shown in Table 2 was added as a pleochroic dye to the foregoing phenylcyclohexane type mixed liquid crystal ZLI-1132, heated to 70° C. or higher, well stirred when the mixed liquid crystal became isotropic liquid, then allowed to cool. These procedures were repeated to dissolve the dye.

The thus prepared liquid crystal composition was sealed in an element composed of upper and lower two glass plates with a plate-to-plate gap of 10 to 100 μm, with the surface of the plate to be in contact with the liquid crystal having been coated with a polyamide resin and, after hardening the resin, having been subjected to rubbing treatment to conduct homogeneous orientation treatment. In the above-described element device having been subjected to the orientation treatment, the above-described liquid crystal composition took, when no electric potential was applied thereto, a homogeneously oriented state wherein the liquid crystal molecules and the dye molecules are oriented in parallel with the electrode plane in a definite direction. Thus, the dye molecules are similarly oriented following the host liquid crystal.

Absorption spectrum of the thus prepared guest-host type element was measured using the light polarized parallel and perpendicular to the direction of the liquid crystal molecules to determine absorbances $A_\parallel$ and $A\perp$ of the dye for the polarized lights and maximum absorption wavelength. In determining absorbance of the dye, corrections were made for the absorption of host liquid crystal and of glass plates and for reflection loss of the element. Order parameter S was determined according to the foregoing equation:

$$S = \frac{A_\parallel - A\perp}{2A\perp + A_\parallel}$$

using the thus determined absorbances $A_\parallel$ and $A\perp$ of the dye for the polarized lights, and dichroism ratio R according to the following equation:

$$R = A_\parallel / A\perp$$

EXAMPLE 2

A liquid crystal composition prepared by adding dye No. 3 in Table 2:

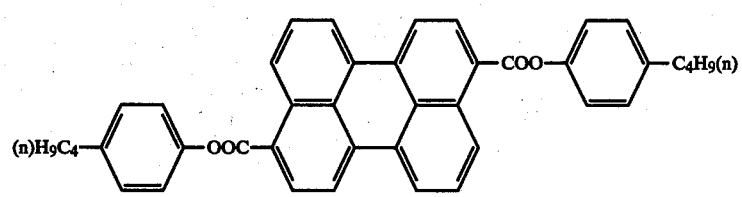

to the same liquid crystal as used in Example 1 in a content of 1.11% by weight was sealed in the same element as used in Example 1 (plate-to-plate gap: about 10 μm), and absorption spectrum was measured in the same manner as in Example 1. The spectrum thus obtained is shown in FIG. 1, wherein curve shows A∥ and curve 2 A⊥. Maximum absorption wavelength in visible region was 477 nm, and A∥ and A⊥ at the maximum absorption wavelength were 1.002 and 0.127, respectively. Therefore, order parameter S of the dye of this example was 0.70, and the dichroism ratio R 7.9. Additionally, the dye of this example has a melting point of 280° to 281° C.

EXAMPLE 3

Figure 2:
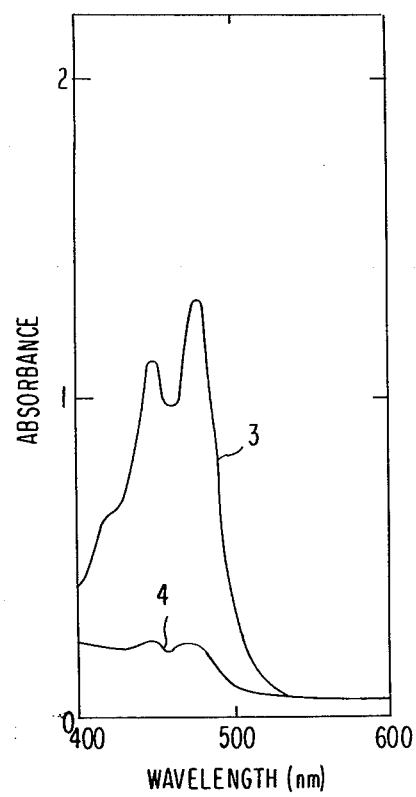

A liquid crystal composition prepared by adding dye No. 4 in Table 2:

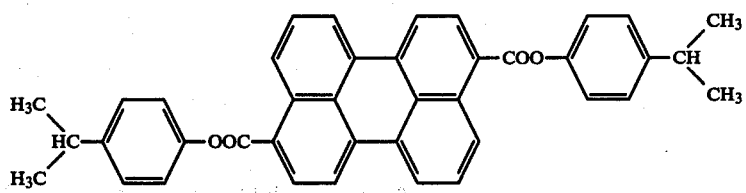

to the same liquid crystal as used in Example 1 in a content of 1.15 wt% was sealed in the same element as used in Example 1 (plate-to-plate gap: about 10 μm), and absorption spectrum was measured in the same manner as in Example 1. The spectrum thus obtained is shown in FIG. 2, in which curve 3 shows A∥ and curve A⊥. Maximum absorption wavelength in visible region was 477 nm, and A∥ and A ⊥ at the maximum absorpion wave-length were 1.232 and 0.166, respectively. Therefore, order parameter S of the dye of this Example was 0.68, and the dichroism ratio R 7.4. Additionally, the dye of this Example has a melting point of 260° to 261° C.

EXAMPLE 4

Figure 3:
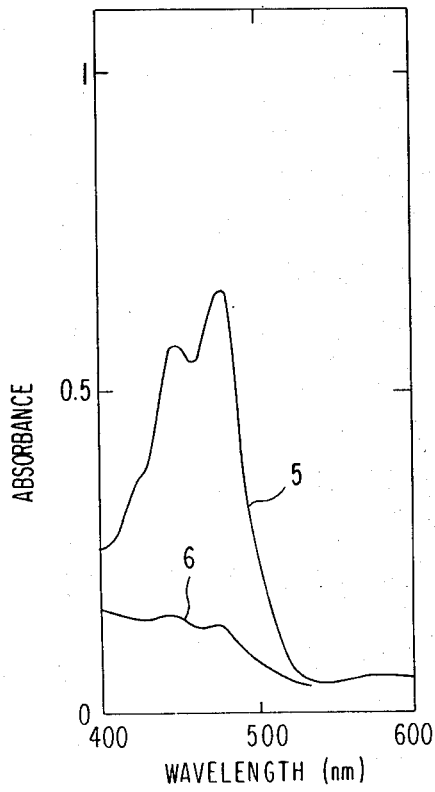

A liquid crystal composition prepared by adding dye No. 5 in Table 2:

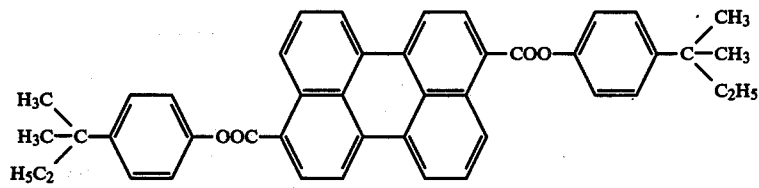

to the same liquid crystal as used in Example 1 to saturation was sealed in the same element as used in Example 1 (plate-to-plate gap: about 10 μm), and absorption spectrum was measured in the same manner as in Example 1. The spectrum thus obtained is shown in FIG. 3, wherein curve 5 shows A∥ and curve 6 A⊥. Maximum absorption wavelength in visible region was 477 nm, and A∥ and A⊥ at the maximum absorption wavelength were 0.594 and 0.081, respectively. Therefore, order parameter S of the dye of this Example was 0.68, and the dichroism ratio R 7.3. Additionally, the dye of this Example has a melting point of 300° to 301° C.

EXAMPLE 5

Figure 4:
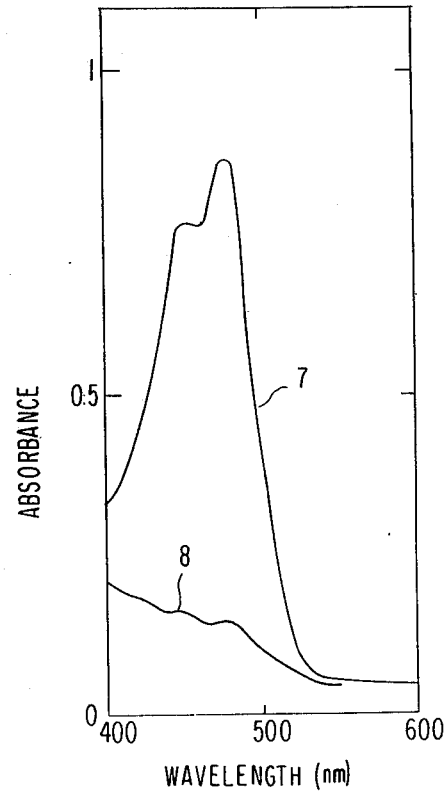

A liquid crystal composition prepared by adding dye No. 8 in Table 2:

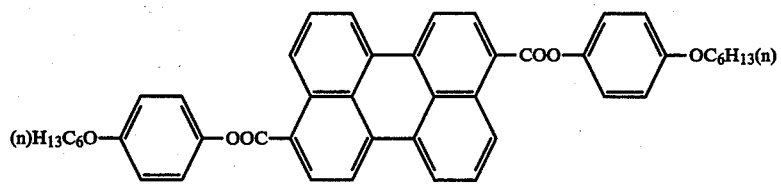

to the same liquid crystal as used in Example 1 to saturation was sealed in the same element as used in Example 1 (plate-to-plate gap: about 10 μm), and absorption spectrum was measured in the same manner as in Example 1. The spectrum thus obtained is shown in FIG. 4, wherein curve 7 shows A∥ and curve 8 A⊥. Maximum absorption wavelength in visible region was 478 nm, and A∥ and A⊥ at the maximum absorption wavelength were 0.801 and 0.092, respectively. Therefore, order parameter S of the dye of this Example was 0.72, and the dichroism ratio R 8.7. Additionally, the dye of this Example had a melting point of 317° to 319° C.

EXAMPLE 6

Figure 5:
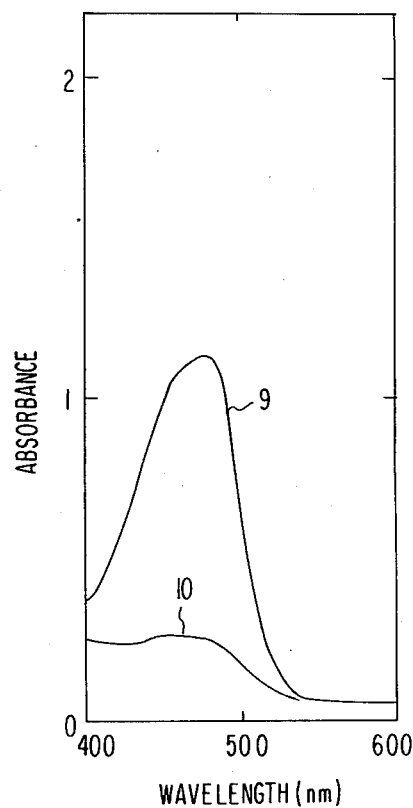

A liquid crystal composition prepared by adding dye No. 20 in Table 2:

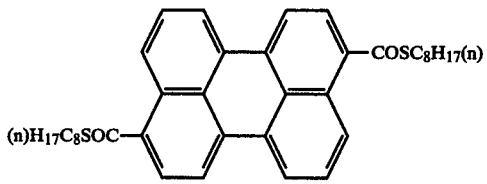

to the same liquid crystal as used in Example 1 in a content of 1.10 wt% was sealed in the same element as used in Example 1 (plate-to-plate gap: about 10 μm), and absorption spectrum was measured in the same manner as in Example 1. The spectrum thus obtained is shown in FIG. 5, wherein curve 9 shows $A_\parallel$ and curve 10 $A\perp$. Maximum absorption wavelength in visible region was 475 nm, and $A_\parallel$ and $A\perp$ at the maximum absorption wavelength were 1.068 and 0.127, respectively. Therefore, order parameter S of the dye of this Example was 0.61, and the dichroism ratio R 5.7. Additionally, the dye of this Example has a melting point of 146° to 147° C.

EXAMPLE 7

Figure 6:
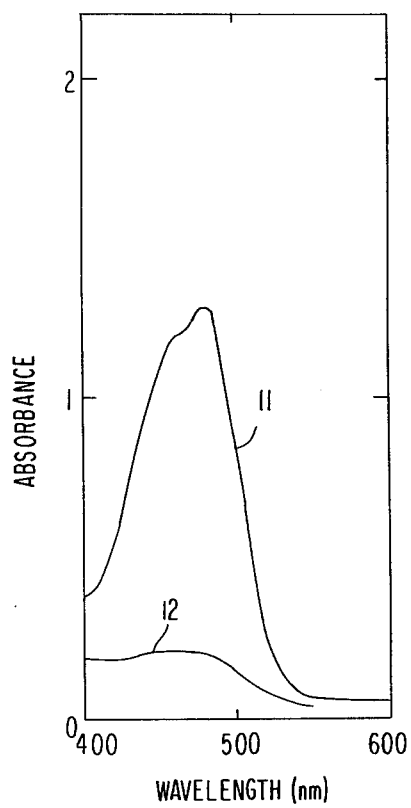

A liquid crystal composition prepared by adding dye No. 21 in Table 2:

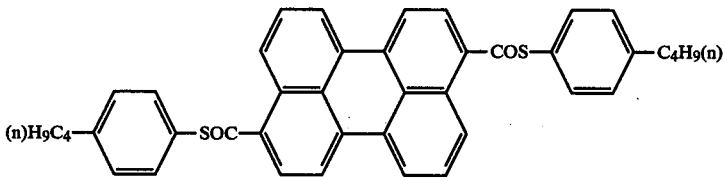

to the same liquid crystal as used in Example 1 in a content of 1.12 wt% was sealed in the same element as used in Example 1 (plate-to-plate gap: about 10 μm), and absorption spectrum was measured in the same manner as in Example 1. The spectrum thus obtained is shown in FIG. 6, wherein curve 11 shows $A_\parallel$ and curve 12 $A\perp$. Maximum absorption wavelength in visible region was 480 nm, and $A_\parallel$ and $A\perp$ at the maximum absorption wavelength were 1.208 and 0.134, respectively. Therefore, order parameter S of the dye of this Example was 0.73, and the dichroism ratio R 9.0.

EXAMPLE 8

In order to examine practical stability of the guest dyes to be used in the liquid crystal composition of the present invention, accelerated weathering tests were conducted. That is, the above-described liquid crystal compositions respectively containing the dyes described in Examples 2 to 7 sealed in the above-described elements were left for about 100 hours in a sunshine weather meter to follow the absorbance-decreasing ratio. For comparison, dyes having hitherto been typically used were similarly sealed in the elements and subjected to the accelerated weathering tests. The sunshine weather meter used in this Example contained a carbon arc lamp as a light source, with conditions within the sample room being about 50° C. in temperature and about 90% in humidity. The accelerated weathering tests were conducted with protecting the elements by means of an ultraviolet ray-cutting filter.

Figure 7:
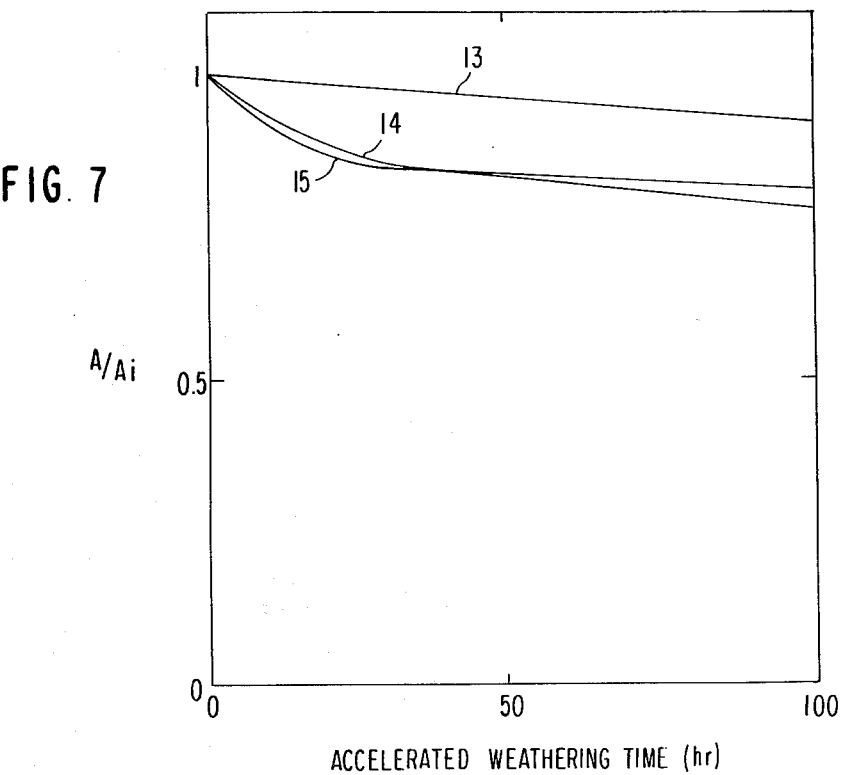
FIG. 7 shows change with time in absorbances of the elements containing the perylene type dyes of the present invention and of the elements containing conventional typical dichroic dyes.

The results of the accelerated weathering tests using the above-described weather meter are shown in FIG. 7. In the graph shown by FIG. 7, ratio of absorbance A at each point to initial absorbance $A_i$, $A/A_i$, is plotted as ordinate and accelerated weathering time as abscissa.

In FIG. 7, curve 13 shows change in absorbance of the element containing the dye of Example 2 to Example 7, curve 14 shows change in absorbance of the element containing an azo dye (hereinafter referred to as dye A):

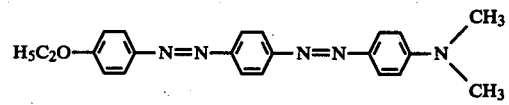

and curve 15 shows change in absorbance of the element containing an azo dye (hereinafter referred to as dye B):

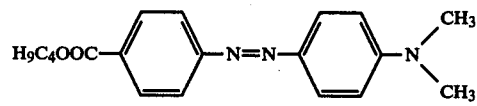

It is clear from FIG. 7 that the dyes of the present invention are more stable than the prior art dyes represented by dyes A and B.

While the invention has been described in detail and with reference to specific embodiments thereof, it will be apparent to one skilled in the art that various changes and modifications can be made therein without departing from the spirit and scope thereof.

What is claimed is:

1. A liquid crystal composition comprising a host nematic, cholesteric or smectic liquid crystal and at least one perylene dye dissolved therein represented by the formula:

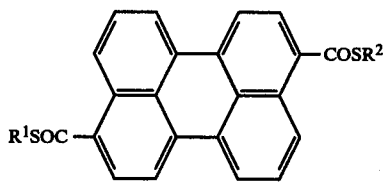

wherein $R^1$ and $R^2$ each represents an aryl group selected from the group consisting of a phenyl group, a substituted phenyl group, an α-naphthyl group, a substituted α-naphthyl group, a β-naphthyl group, and a substituted β-naphthyl group, or an alkyl group containing 1 to 18 carbon atoms, each of said substituted groups being substituted by at least one alkyl group, alkoxyalkyl group, cycloalkyl group, alkoxy group, aryl group, aralkyloxy group, ester group, acyloxy group or a halogen atom.

2. A liquid crystal composition as claimed in claim 1, wherein said perylene dye is dissolved in the host liquid crystal in an amount such that the fluorescence of the dye can be recognized visually.

3. A liquid crystal composition as claimed in claim 1 or 2, wherein said perylene dye is the dye represented by the formula:

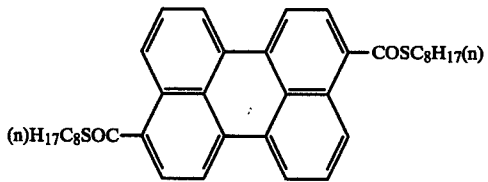

4. A liquid crystal composition as claimed in claim 1 or 2, wherein said perylene dye is the dye represented by the formula:

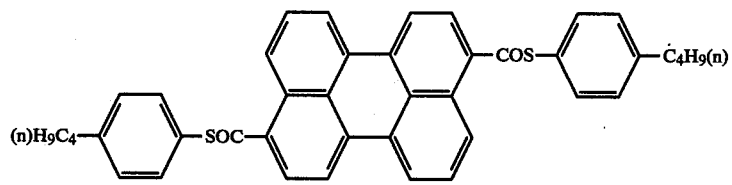

5. A liquid crystal composition as claimed in claim 1, wherein said host liquid crystal is a nematic liquid crystal which takes a cholesteric state by containing an optically active substance selected from the group consisting of chiral nematic compounds, alcohol derivatives, ketone derivatives, carboxylic acid derivatives, aldehyde derivatives, alkene derivatives, amines, amides and nitriles.

* * * * *